United States Patent [19]

Bédard

[11] Patent Number: 5,592,284
[45] Date of Patent: Jan. 7, 1997

[54] SINGLE CONNECTION AUTOMATED BI-DIRECTIONAL FIBEROPTIC ATTENUATION MEASUREMENT SYSTEM

[75] Inventor: Michel Bédard, Québec, Canada

[73] Assignee: Nortech Fibronic Inc., Quebec, Canada

[21] Appl. No.: 426,926

[22] Filed: Apr. 21, 1995

[51] Int. Cl.[6] .......................... G01N 21/27; G01N 21/59
[52] U.S. Cl. ............................................................ 356/73.1
[58] Field of Search ............................................ 356/73.1

[56] References Cited

U.S. PATENT DOCUMENTS

| 4,234,253 | 11/1980 | Higginbotham et al. | 356/73.1 |
|---|---|---|---|
| 4,673,291 | 6/1982 | Heckmann | 356/73.1 |
| 4,726,676 | 2/1988 | Maslaney et al. | 356/73.1 |
| 4,737,026 | 4/1988 | Dalgoutte et al. | 356/73.1 |
| 5,305,078 | 4/1994 | Lamonde | 356/73.1 |
| 5,455,672 | 10/1995 | Lamonde et al. | 356/73.1 |

FOREIGN PATENT DOCUMENTS

58-100733  6/1983  Japan ..................................... 356/73.1

Primary Examiner—Vincent P. McGraw

[57] ABSTRACT

Bi-directional attenuation of an optical fiber is measured using a half duplex Manchester type fiber optic transceiver having receiving circuitry that combines optical power and wavelength meter. A communication protocol insures sequential timings of digital transmission/reception sequences and measures from two transceivers, one at each side of the fiber under test. Measured wavelengths are used to digitally compensate the power level wavelength dependency of the transceivers optical receiving paths. Attenuations from both directions are determined using the compensated measured power levels and digitally transmitted power levels. Fiber optic jumper cables connecting the transceivers to the fiber under test are independently referenced at each side from the single connector of the transceiver.

7 Claims, 5 Drawing Sheets

SINGLE CONNECTION AUTOMATED BI-DIRECTIONAL FIBEROPTIC ATTENUATION MEASUREMENT SYSTEM

BACKGROUND

1. Field of the Invention

This invention relates to the measurement of attenuation of an optical signal in an optical fiber, and is particularly concerned with a method and apparatus thereof for facilitating attenuation measurements at one or more different optical signal wavelengths.

2. Description of the Prior Art

Fiber optics have found increasing uses in many applications, especially in the telecommunication field. Fiber optic test instruments are used to characterize the quality of fiber optic links. The measure of loss (or attenuation) in a fiber optic is essential, since the loss is a limiting factor in distance communication. Moreover, measurement of a loss higher than normal, even within a loss budget of a fiber optic communication system, can pinpoint future system degradation.

Several light sources and power meters are available to measure losses in optical fibers. These instruments always require a multiple-branching procedure, when measuring the attenuation from both directions of an optical fiber. Conventional power meters will respond differently according to the wavelength of light. The user has to instruct the power meter of the wavelength actually measured. This method for compensating the response is prone to error and in most cases the user will just know the nominal wavelength of a light source, thus inaccuracy may occur as the actual wavelength of a light emitting diode (LED) or laser may differ by as much as 60 nm from each other.

Moreover, a fiber under test shows different attenuation values for different wavelengths. In order to correctly determine attenuation, it is then important to know the exact wavelength of the source used to perform the test.

* U.S. Pat. No. 4,234,253 Higginbotham et al., 18 Nov. 1980 illustrates a fiber optic attenuation measuring arrangement in which a feedback loop is used, in a transmitter, to maintain a constant output power level of a transmitted optical signal. The arrangement includes a test signal accompanying a high-amplitude timing pulse. At a receiver end, the timing pulse is separated and used to demodulate the test signal. The test signal is compared to a reference signal, to determine attenuation of a fiber under test. The invention is not concerned with measuring attenuation at different optical signal wavelengths nor with bi-directional characteristics.

* U.S. Pat. No. 4,673,291 Heckmann, 16 Jun. 1987, illustrates an optical attenuation measuring arrangement in which the light power of an optical signal input to a fiber is encoded on the optical signal, using a digital pulse frequency modulation, the optical signal input is demodulated at the receiver end and thereafter used in measuring attenuation of the optical signal in the fiber. This is an improvement since the use of digital communication enables a faster and more efficient protocol and flexibility proper to digital systems, compared to older all analog technologies. However, Heckmann is not concerned with measurements at different wavelengths.

* U.S. Pat. No. 4,726,676 Maslaney et al. 23 Feb. 1988, illustrates an optical attenuation measuring arrangement in which optical test signals of different wavelengths are modulated with respective AC signals to identify the respective wavelengths arriving at a receiver end. A comparison value, which takes into account the wavelength-dependent sensitivity of a detector of the receiver, is stored in the receiver for each optical signal wavelength and is used with a received optical signal transmitted via an optical fiber. Although this is an improvement over existing methods since the transmitter provides the exact actual wavelength to the receiving unit instead of assuming a nominal value, this arrangement requires expensive temperature stabilized circuits in order to maintain the wavelength values of optical sources. Maslaney may also transmit both power and wavelength but requires as many different modulating AC signal frequencies as there are different optical signal wavelengths and powers. The receiver scans numerous AC signal frequencies before hitting the proper frequency, thus involves a time consuming protocol.

* U.S. Pat. No. 4,737,026, Dalgoutte, 12 Apr. 1988, illustrates an apparatus that combines two transmitting optical sources and one receiving channel on a single optical fiber. This invention is a reflectometer and is not concerned with measuring optical attenuation. Bi-directional loss testers may be known as a result of combining transmitting and receiving optical ports of an invention such as described in Maslaney and including a device such as fiber optic coupler, as shown by Dalgoutte. Such a setup would still have the same limitations as the Maslaney approach and would require an efficient method in order to implement it efficiently.

* U.S. Pat. No. 5,305,078 Lamonde, 19 Apr. 1994, illustrates a system wherein attenuation of an optical signal is measured by transmitting, to the fiber, an optical signal having a pre-defined wavelength, and by FSK modulating of the optical signal with information identifying the wavelength and transmitted power of the optical signal. At the receiver end, the wavelength information is used to scale the gain of a receiving amplifier to compensate for detector gain vs. wavelength response. A DC continuous wave optical signal is then measured and converted into a digital value for use with the transmitted power information to determine the fiber attenuation at the predetermined wavelength. By means of separate transmitting and receiving ports, this invention provides easy referencing of jumper cable losses without having to join two testers together. This invention has the same limiting factor as Maslaney with respect to wavelength drift when using laser without temperature stabilization circuits as it does not provide adequate insensitivity to wavelength drift after a permanent memory factory calibration. The use of a DC continuous wave signal increases noise and subjects the invention to offset drift.

SUMMARY OF THE INVENTION

It is an object of the present invention to provide very accurate loss measurements despite of wavelength differences from a source to another and despite wavelength changes over temperature changes, thus allowing the use of inexpensive coaxial type laser or LED sources which do not incorporate thermal elements and sensors.

Another object is to provide bi-directional attenuation testing in a fast and efficient manner with only one connection, thus having human intervention reduced to the minimum.

Still another object of the invention is to compensate loss measures by discarding the losses of fiber optic jumper cables without having to join two testers together nor to add a second power meter port on the apparatus. In an ergonomic package, the place of a second output port would instead be used for an optional value added function such as visible inspection laser.

In accordance with the invention, bi-directional fiber optic attenuation measurement is provided using two identical bi-directional transceivers one at each end of the optical fiber under test. All measurements are performed with a one-time connection that can be conveniently done through fiber optic jumper cables (FOJC) that link to the optical fiber under test. Communications and measures are supported by means of a special digital modulation scheme, which is suitable for both data transmission and average signal level measurement. This is crucial to enable more efficient use, and faster tests in utilization of this loss measurement dedicated transceiver. Proper timing is insured through a master (MST)/slave (SLV) protocol based on the transceiver which requested testing first. When a transceiver receives a signal from another transceiver, it switches to slave mode and gets commands remotely from the transceiver that sent the signal, which is then known as master. The process works both ways and the master is only determined by whichever transceiver sent a signal first.

One embodiment is able to measure the actual incoming wavelength in order to give precise, wavelength independent, measures of attenuation and be able to supply the information as to which actual wavelength has been used to test the fiber.

The invention can perform a total, or referenced loss measurement. A total attenuation measurement comprises the loss of FOJCs used to connect the transceivers to the fiber under test. However, it is desirable to measure the loss of the fiber under test itself, making the cancelling of FOJC losses mandatory. This is accomplished by having each transceiver independently measuring the loss of its associated FOJC. Such measurement is conducted with the transceiver acting as an Optical Return Loss Meter (ORL) by transmitting light and measuring from the receiving channel at the same time. The transceiver measures the difference of the ORL of a reflector connected directly to the output port, and connected through the jumper in order to get the FOJC loss.

BRIEF DESCRIPTION OF THE DRAWINGS

The invention will be better understood from the following description with reference to the accompanying drawing, in which.

DESCRIPTION OF THE PREFERRED EMBODIMENT

Figure 1:
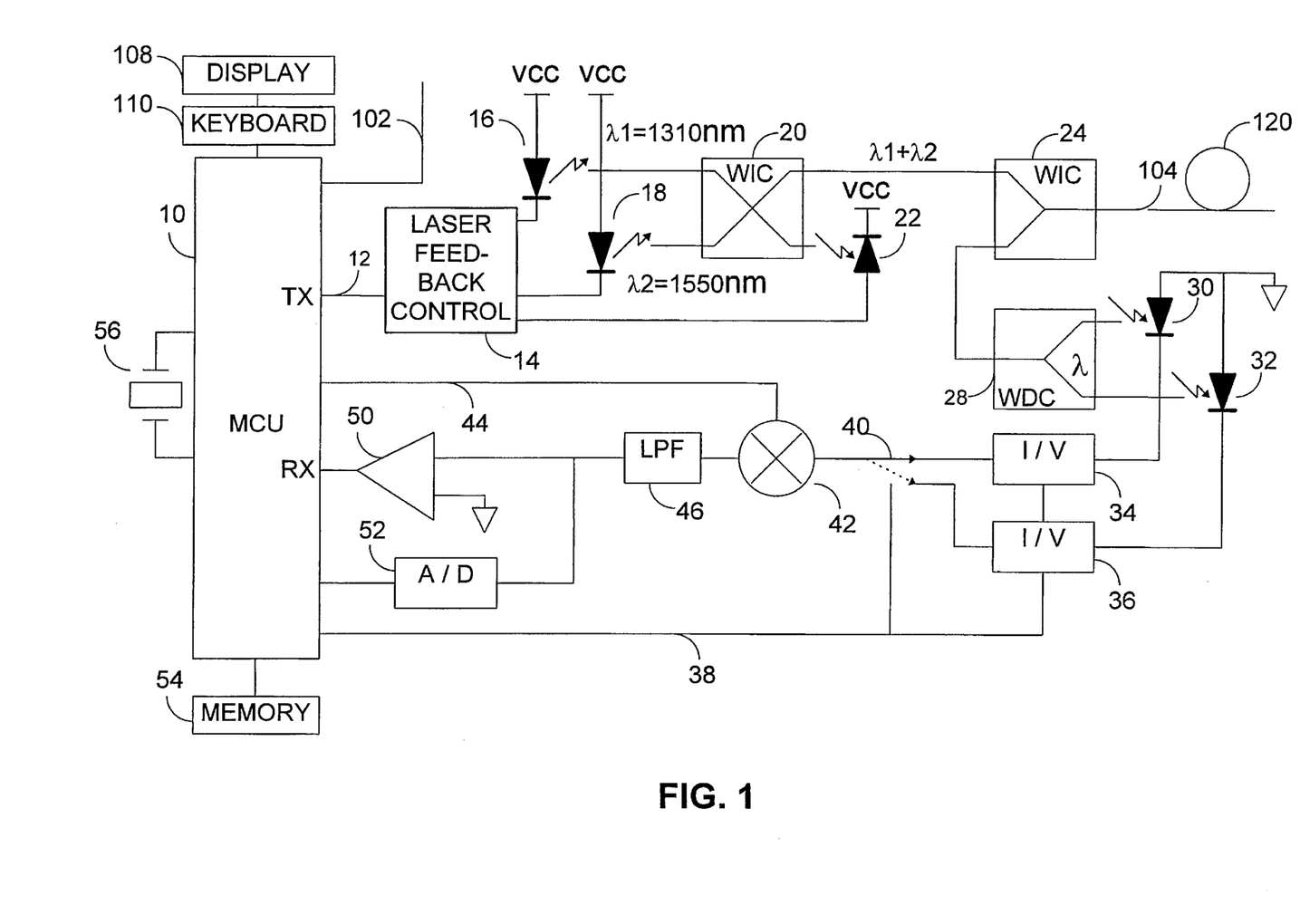
FIG. 1 is a circuit block diagram of the preferred embodiment.

FIG. 1 depicts the preferred embodiment of the invention in accordance with the invention for use in measuring the attenuation of an optical fiber. A central micro-controller unit (MCU) 10 governs the whole operation of the invention. The memory 54 includes random access memory for computing and temporary storage of digital values. It also includes electrically erasable memory that is used to store the calibration parameters and the program algorithm that can be completely reprogrammed without having to open the apparatus case 100—FIG. 2—as new algorithms are developed to improve the performance of the system. Such reprogramming is accomplished through the connection of a serial port 102 to an external personal computer.(not illustrated)

A laser feedback control 14 provides a predetermined stable output power level from one of two laser diode sources 16 and 18 (nominally 1310 nm and 1550 nm) by means of an optical feedback through a wavelength independent fiberoptic coupler 20 and a photo-detector 22. Wavelength insensitivity of this coupler insures that the ratio of the light at its two outputs is constant regardless of laser wavelength drift due to temperature. The laser feedback control adjusts the current of one of the sources 16 or 18, in order to see a constant peak signal value from the detector 22, thus insuring a constant output level at the second output branch of the coupler 20. This light beam is directed at the output connector 104 through a second wavelength independent coupler 24, that will again preserve a substantially constant power level at its output regardless of potential wavelength changes of the sources.

The laser feedback control 14 selects and modulates a laser 16 or 18, according to the transmitted signals 12 generated by the MCU. A Manchester modulated signal 12 is generated by the MCU which in turn modulate the light output of the apparatus at its optical connector 104. The modulated signal 12 is derived from the MCU quartz crystal oscillator 56, thus high frequency precision is insured.

The wavelength independent coupler 24 combines receiving and transmitting light paths at a single output connector 104. This is a two by one coupler with low return loss insuring low parasitic light level reflected back from the transmitting path to the receiving path, therefore enabling the use of the invention as a optical return loss tester (ORL).

A light beam incoming from an external fiber under test 120 through the optical connector 104 is split between the two branches at the opposite side of the coupler 24. The light portion in direction of the laser sources is simply ignored. The other useful portion is passed through a wavelength dependent coupler 28 which will again, split the incoming light beam, but with a coupling ratio (ratio of the two light levels at outputs) that uniformly increases through the wavelength range of interest. Light level outputs from each branch are converted to current by photo-detectors 30 and 32, then converted to voltage by gain programmable current to voltage converters 34 and 36. The MCU selects in alternation the two channels with proper gains by means of switch and gain control signal 38 which activate the channel select switch 40 and the gain controlled I/V converters 34 and 36. For each channel, the MCU will select the gain in order to measure proper inbound values through the lock-in amplifier 42, low pass filter 46 and the A/D converter 52.

Figure 5:
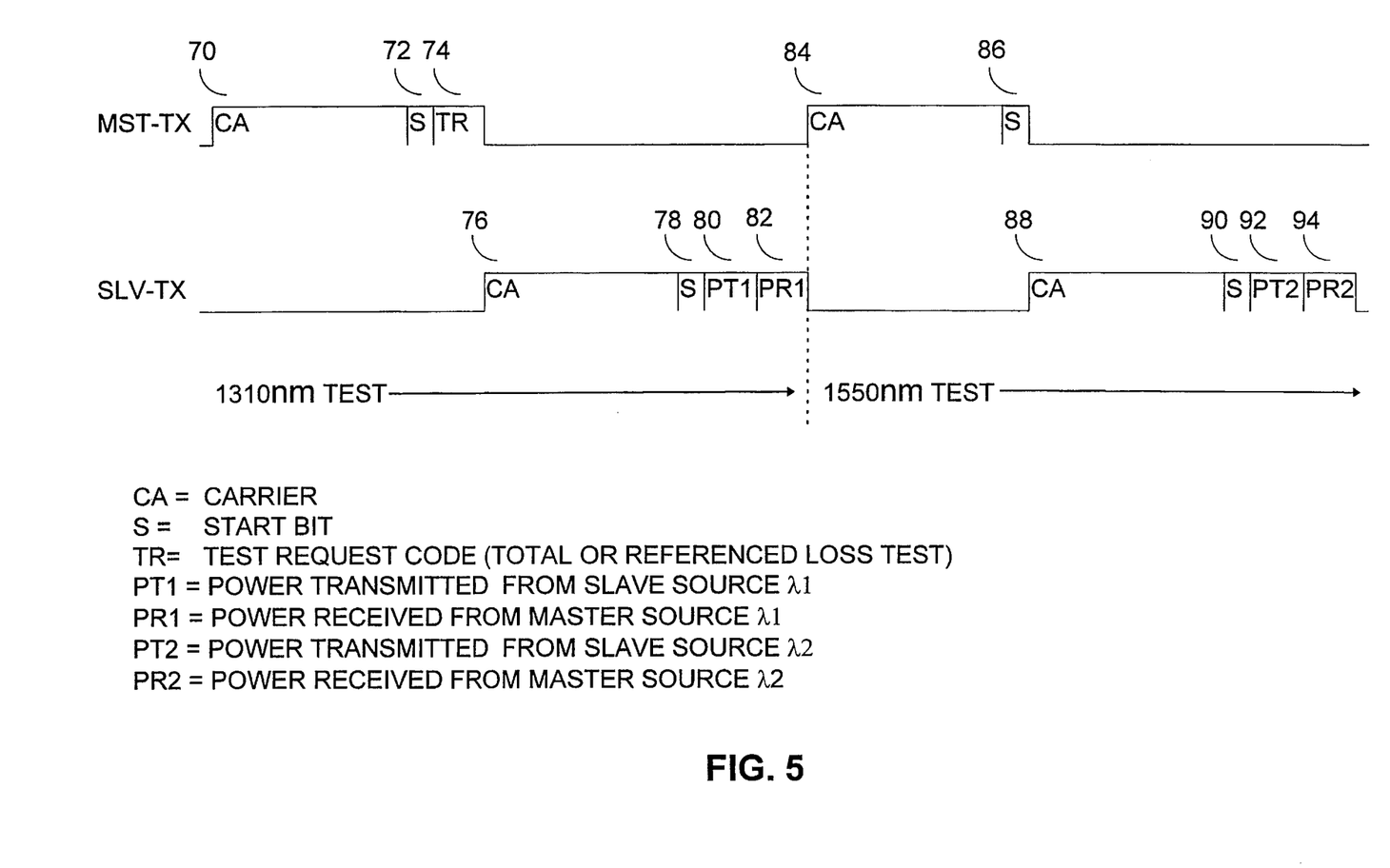
FIG. 5 is a waveform diagram illustrating the communication protocol.

A Manchester signal from a transmitting unit starts with a carrier wave 70, 76, 84 or 88—FIG. 5—of a fixed pre-determined AC frequency. The carrier wave duration is made long enough to insure proper clock recovery and measuring signal level at a receiving unit. Given this signal, the MCU of a receiving unit will generate a recovered clock signal 44 of the same pre-determined frequency by mean of its own precise quartz crystal oscillator 56. Depending on its digital value (high or low), this signal forces the lock-in amplifier to act as a unity gain follower or inverter. The MCU 10 shifts the phase of the recovered clock signal 44 until a maximum level is read from the output of the lock-in amplifier, condition which occurs when the recovered clock is in phase with the incoming signal carrier. At this stage, the average signal level of the AC signal is restored at the output of the low pass filter 46, and converted to digital value by the A/D converter 52. By means of the channel select switch 40 and still maintaining the recovered clock signal with previously found phase, the MCU measures the level of the second measuring channel 32, 36. By determining the ratio of the levels from the two channels, and passing through a calibration table previously stored in an EEPROM memory 54, the actual received wavelength value is determined by the MCU. The sum of the levels from the two channels is in proportion with the total incoming power level from the optical connector 104. Using this sum corrected with previously determined wavelength sensitivity information upon measured wavelength, the MCU calculates wavelength independent measures of incoming light power.

When a start bit arises 72, 78, 86 or 90, according to the Manchester coding scheme, the phase of the fixed AC frequency is shifted by 180°. The MCU still maintains the phase adjusted recovered clock 44, thus the lock-in amplifier outputs a reversed polarity signal due to the reversal of the input signal alternations. Subsequent bits carrying digital information 74, 80, 82, 92 or 94 are coded the same way. The lock-in amplifier then acts as a Manchester demodulator since bits are restored as bipolar analog levels which are then filtered by 46 to suppress unwanted noise. A comparator 50 restores the Manchester de-modulated signal to digital levels readable by the MCU for bits acquisition at the middle of each recovered clock cycle.

A second embodiment can be realized by omitting the lock-in amplifier 42. In that case, the way the signal is transmitted still offers the advantage of having a fixed carrier wave prior to digital coding thus allowing the dual task of clock recovery and signal level detection. According to this second embodiment, a modified digital level comparator 50 outputs a direct image of the carrier and Manchester coded signal to the MCU, by taking advantage of the constant 50% duty cycle of the Manchester coded waveform. Internally, the MCU can then rapidly de-modulate by recovering the clock using this direct signal prior to sampling a proper intervals. Since the AC carrier wave has constant average level, proper measures from the A/D converter 52 are possible. This second embodiment shortens the time to perform clock recovery and measure, thus improving the overall time to conduct a complete loss test using the same protocol described below.

Figure 2:
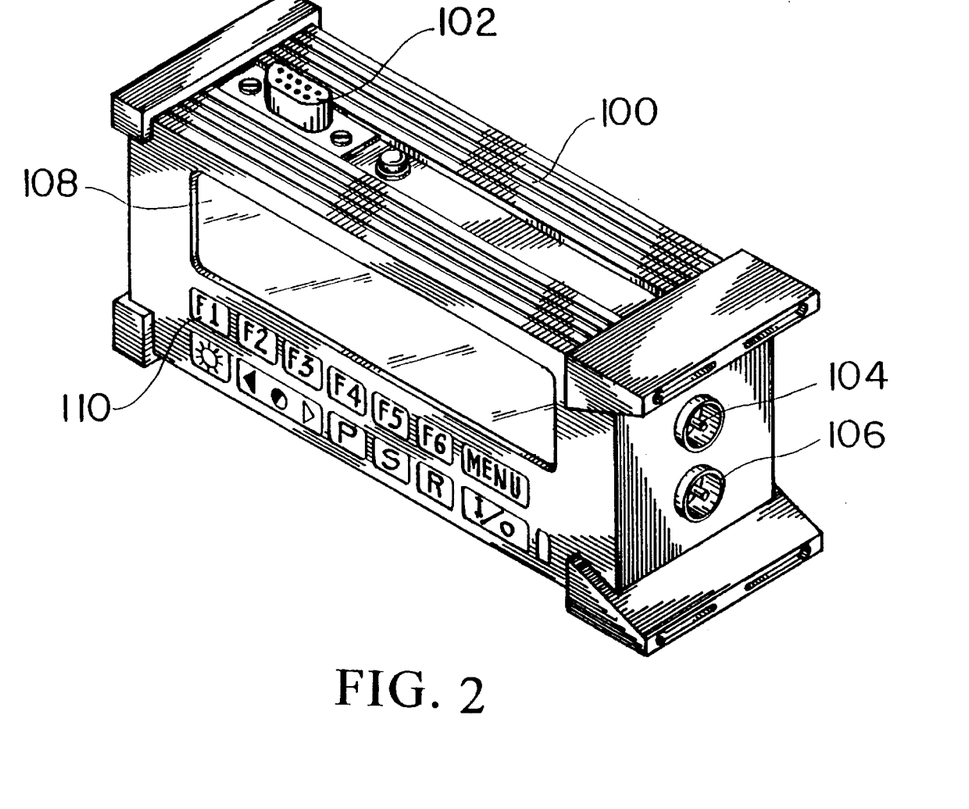
FIG. 2 is a view of the apparatus.

FIG. 2 shows a general view of the apparatus as a single unit 100. A serial port 102 is used to download new softwares, upload test results to a personal computer or print test results to a serial printer. It also provides a service interface menu for calibration or servicing. The main optical connector port 104 can be used as the automatic loss testing input/output port, ORL port, dual source output port, power meter input port, wavelength meter input port or data communication port. An optional independent red laser port 106 is provided for visual inspection of fibers. A large graphic LCD screen 108 has the capability to display all bi-directional loss results at the same time or text messages received from a remote unit. Soft keys are provided using a regular keyboard 110 and a portion of the screen 108 to name the key functions according to pre-defined menus. Among others, some keys from the keyboard 110 are dedicated to data logging or for the contrast control and backlighting of the display 108.

Figure 3:
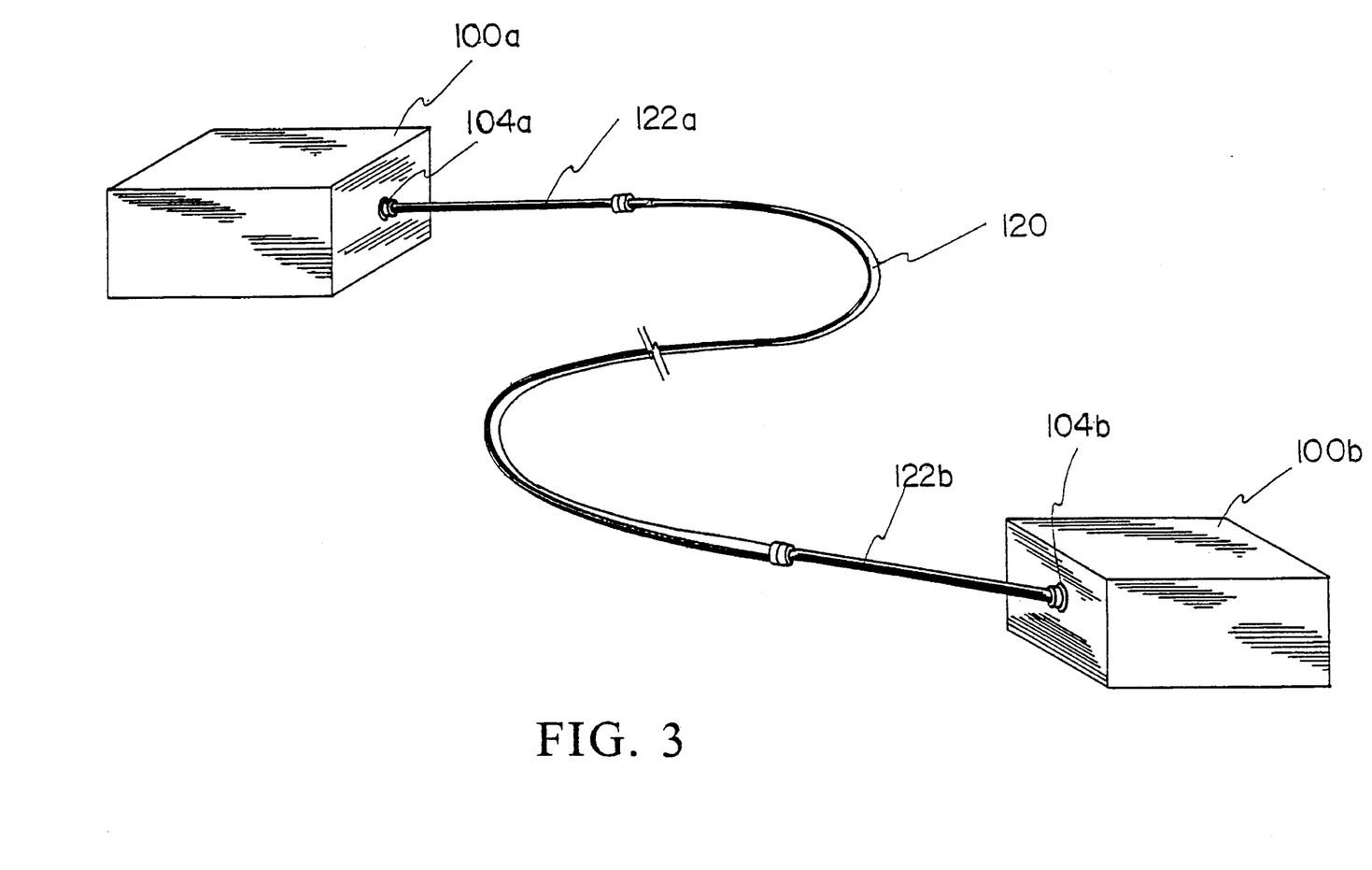
FIG. 3 is a view illustrating the apparatus in operation.

FIG. 3 shows two apparatuses 100a and 100b in the loss testing mode. Each single unit is linked to the optic cable under test 120 by fiber optic jumper cables 122a and 122b, connected to respective optical connector ports 104a and 104b. Fiber optic jumper cables 122a, 122b attenuations have to be measured separately prior to this test, in order to isolate the loss of the fiber under test 120.

Figure 4A:
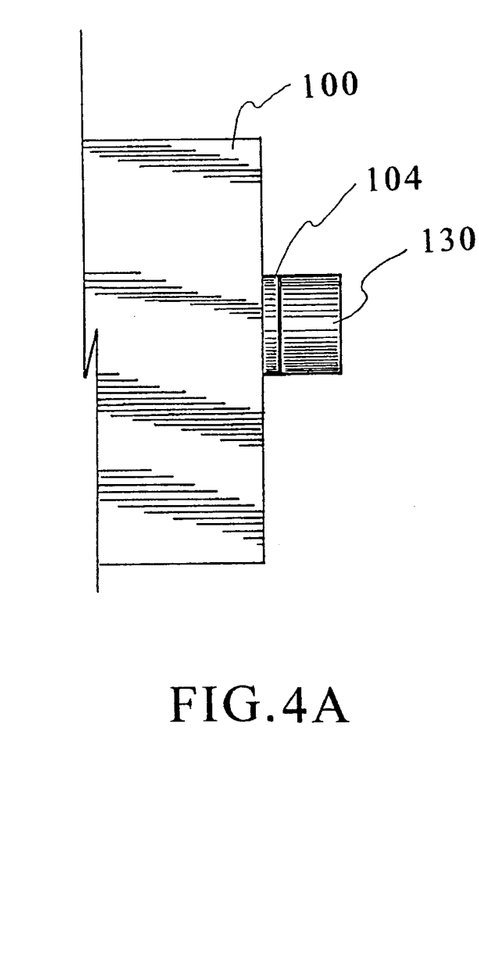
FIG. 4A is a view illustrating the apparatus with a reflector.
Figure 4B:
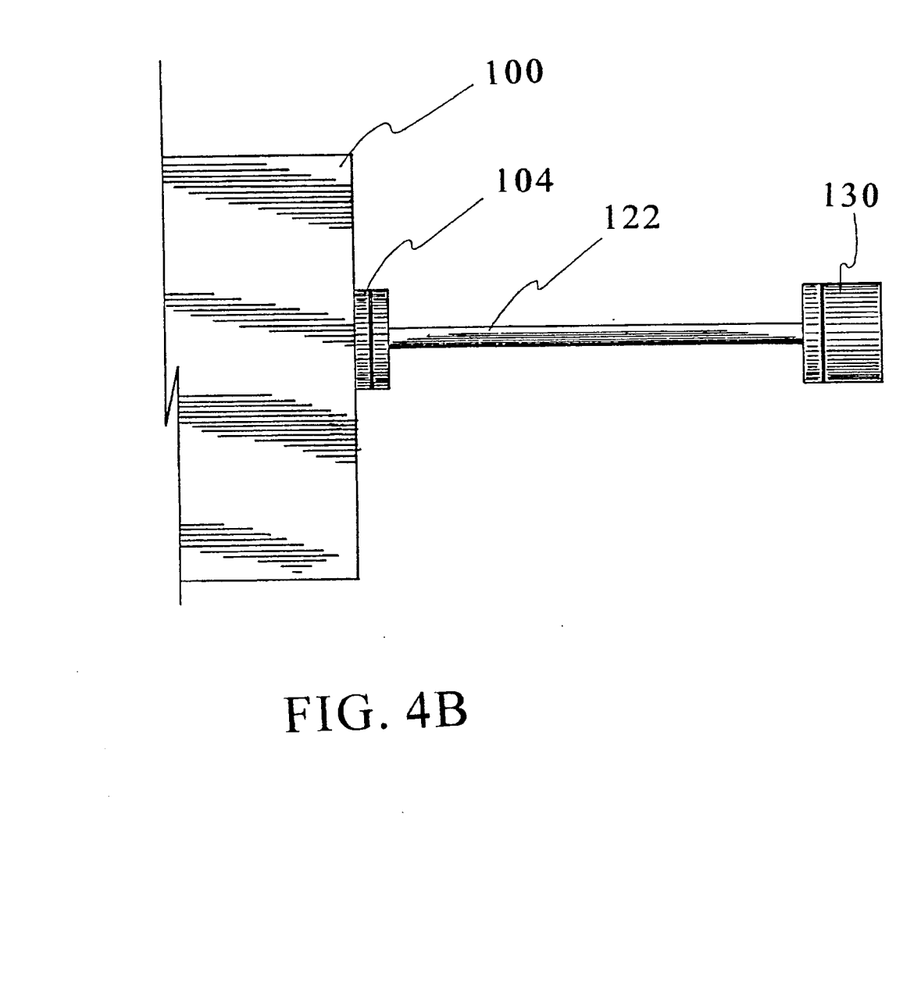
FIG. 4B is a view illustrating the apparatus with a fiber optic jumper cable and the reflector.

FIG. 4A and FIG. 4B shows a method used to measure FOJC attenuation using a single apparatus 100. First, the apparatus sends a light beam, and a reflector 130 is installed in front of the beam at the connector 104. Power reflected inside the unit gives a reference reading of the mirror reflection coefficient. The adapter cable 122 is then placed in-between the connector 104 and the reflector 130. The measured power is then compared to the one read without the adapter cable 122. The difference between the two values is in proportion with the attenuation of the FOJC 122. The same test procedure can be applied to the other FOJC at the other end of a fiber optic cable under test 120.

FIG. 5 shows a method used to govern the operation of the invention. Using its first source, a first instrument 100a—FIG. 3—further called Master or MST, initiates a test by sending a carrier tone 70—FIG. 5—of a fixed known frequency for a sufficient time to allow detection from a second instrument 100b (Slave or SLV). If the attenuation of the fiber link 122a, 120, 122b, down to SLV is within the dynamic range of the system, the SLV will detect a light signal above a minimum predetermined limit. SLV will then perform gain ranging, lock on the Manchester carrier and measure the signal wavelength and power level. A start bit 72 is then transmitted by MST to time mark the subsequent Manchester modulation of a Test Request Code (TR) 74. Once received, this Code will inform the SLV to choose between a total loss test (including FOJC losses) or a referenced loss test (excluding the FOJC losses). Subsequently, with its own first source, the SLV will transmit a Manchester carrier 76, again with a fixed known time and frequency. It is then the proper time for MST to look at light signal above the minimum predetermined limit, perform gain ranging, lock on the Manchester carrier and detect the signal wavelength and power level. SLV continues with a Start bit 78, followed by the Manchester digital modulation of the predetermined average power level 80 of the just previously sent carrier. This value takes into account the FOJC loss if the MST calls for a referenced loss test. Power level measured 82 during carried 70 is modulated. This power level has been corrected by SLV for its receiving path gain dependency among wavelengths using the wavelength measured together with the light level. Again, the SLV associated FOJC reference loss has been added to this value if the MST called for a referenced loss test by previously received test request code 74.

Once this sequence is completed, the MST has in memory all the necessary values to compute bi-directional losses by subtracting transmitted predetermined power levels from measured received power levels from both instruments. At this time MST will take into account its own FOJC loss reference for a referenced loss test.

The MST continues with the second nominal wavelength carrier 84 if required. The procedure 84, 86, 88, 90, 92, 94 is the same as for the first nominal wavelength, except the TR Code 74 is omitted since the SLV already got this information. The actual measured wavelengths from both sides of the fiber link would be that time in the range of the second optical source window (usually from 1520 to 1580 nm assuming a 1550 nm nominal source). After a few seconds, if the SLV did not received a light signal above a predetermined limit, it simply returns to standby.

It should be noted that this procedure can easily be modified to allow the SLV unit to compute and display the same results as the MST unit. Also, wavelengths measured by both units could easily be transmitted between units thus render possible the display status of the exact actual wavelengths that have been used to conduct the test instead of the nominal values.

Although particular embodiments of the invention has been from both sides of the fiber link would be that time in the range of the second optical source window (usually from 1520 to 1580 nm assuming a 1550 nm nominal source). After a few seconds, if the SLV did not received a light signal above a predetermined limit, it simply returns to standby.

It should be noted that this procedure can easily be modified to allow the SLV unit to compute and display the same results as the MST unit. Also, wavelengths measured by both units could easily be transmitted between units thus render possible the display status of the exact actual wavelengths that have been used to conduct the test instead of the nominal values.

Although particular embodiments of the invention has been described in detail, it should be appreciated that numerous modifications, variations, and adaptations may be made thereto without departing from the scope of the invention as defined in the appended claims.

| ITEM LIST |
|---|
| 10. micro-controller unit |
| 12. modulation signal |
| 14. laser feedback control |
| 16. first laser diode source (λ1) |
| 18. second laser diode source (λ2) |
| 20. 2 × 2 wavelength independent coupler |
| 22. feedback photo detector |
| 24. 1 × 2 wavelength independent coupler |
| 28. wavelength dependent coupler |
| 30. first photo-detector |
| 32. second photo-detector |
| 34. first gain controlled I/V converter |
| 36. second gain controlled I/V converter |
| 38. switch & gain control signal |
| 40. switch |
| 42. lock-in amplifier |
| 44. recovered clock |
| 46. low pass filter |
| 50. comparator |
| 52. analog to digital converter |
| 54. memory |
| 56. quartz crystal |
| 70. master's 1st source carrier wave |
| 72. master's 1st source start bit |
| 74. test request code |
| 76. slave's 1st source carrier wave |
| 78. slave's 1st source start bit |
| 80. slave's 1st source power level value |
| 82. power level value measured from master 1st source |
| 84. master's 2nd source carrier wave |

| ITEM LIST -continued |
|---|
| 86. master's 2nd source start bit |
| 88. slave's 2nd source carrier wave |
| 90. slave's 2nd source start bit |
| 92. slave's 2nd source power level value |
| 94. power level value measured from master 2nd source |
| 100. apparatus case |
| 102. serial port |
| 104. optical connector |
| 106. optional independent visible laser |
| 108. display |
| 110. keyboard |
| 120. fiber under test |
| 122. fiber optic jumper cable |
| 130. reflector. |

What is claimed is:

1. A method of measuring attenuation of an optical fiber, wherein said optical fiber is connected in between a first transceiver and a second transceiver, said method comprising the steps of:

at said first transceiver:
 a) transmitting to said second transceiver, through said optical fiber, a first optical signal having a first wavelength, at a first pre-defined transmitted power level, at said second transceiver:
 b) during step a), measuring said first wavelength of said first optical signal received,
 c) during step a), measuring a first received power level from said first optical signal wherein said first optical signal received is compensated with a wavelength sensitivity information of said second transceiver related to said measured wavelength of said first optical signal,
 d) transmitting to said first transceiver, through said optical fiber, a second optical signal having a second wavelength at a second pre-defined transmitted power level,
 e) modulating, on said second optical signal, information identifying said second pre-defined transmitted power level and said measured first received power level, at said first transceiver:
 f) during step d), measuring said second wavelength of said second optical signal received,
 g) during step d), measuring a second received power level from said second optical signal, wherein said second optical signal received is compensated with a wavelength sensitivity information of said first transceiver related to said measured wavelength of said second optical signal,
 h) during step e), demodulating said information identifying said second pre-defined transmitted power level and said first measured received power level,
 i) calculating first transceiver to second transceiver attenuation of said optical fiber using value of said first pre-defined transmitted power level and said demodulated information identifying said first received power level,
 j) calculating second transceiver to first transceiver attenuation of said optical fiber using said demodulated information identifying said second pre-defined transmitted power level and said measured second power level.

2. A method as defined in claim 1 further comprising a number of steps allowing said second transceiver to obtain said second transceiver to first transceiver attenuation and said first transceiver to second transceiver attenuation results.

3. An apparatus for measuring attenuation of an optical fiber, wherein said optical fiber is connected in between a first transceiver and a second transceiver, said apparatus comprising in combination:

at said first transceiver:
means for transmitting to said second transceiver, through said optical fiber, a first optical signal having a first wavelength, at a first pre-defined transmitted power level, at said second transceiver:
means for measuring said first wavelength of said first optical signal received,
means for measuring a first received power level from said first optical signal wherein said first optical signal received is compensated with a wavelength sensitivity information of said second transceiver related to said measured wavelength of said first optical signal,
means for transmitting to said first transceiver, through said optical fiber, a second optical signal having a second wavelength at a second pre-defined transmitted power level,
means for modulating, on said second optical signal, information identifying said second pre-defined transmitted power level and said measured first received power lever, at said first transceiver:

means for measuring said second wavelength of said second optical signal received,
means for measuring a second received power level from said second optical signal, wherein said second optical signal received is compensated with a wavelength sensitivity information of said first transceiver related to said measured wavelength of said second optical signal,
means for demodulating said information identifying said second pre-defined transmitted power level and said first measured received power level,
means for calculating first transceiver to second transceiver attenuation of said optical fiber using value of said first pre-defined transmitted power level and said demodulated information identifying said first received power level,
means for calculating second transceiver to first transceiver attenuation of said optical fiber using said demodulated information identifying said second pre-defined transmitted power level and said measured second power level.

4. An apparatus as defined in claim 3 further comprising additional means for transmitting a number of optical signals having different wavelengths.

5. An apparatus as defined in claim 3 wherein said means for measuring wavelength comprise a wavelength dependent light coupler.

6. An apparatus as defined in claim 3 where said means for measuring power level comprise a gain controlled I/V converter.

7. An apparatus as defined in claim 3 further comprising a display in said first transceiver for displaying said attenuation results.

* * * * *